(12) United States Patent
de Virel

(10) Patent No.: US 7,053,993 B2
(45) Date of Patent: May 30, 2006

(54) LASER POINTING SIGHTING SYSTEM WITH DESIGNATOR RANGE FINDER

(75) Inventor: Dufresne de Virel, Paris (FR)

(73) Assignee: SAGEM Défense Sécurité, Paris (FR)

( * ) Notice: Subject to any disclaimer, the term of this patent is extended or adjusted under 35 U.S.C. 154(b) by 425 days.

(21) Appl. No.: 10/471,045

(22) PCT Filed: Mar. 6, 2002

(86) PCT No.: PCT/FR02/00806

§ 371 (c)(1),
(2), (4) Date: Sep. 5, 2003

(87) PCT Pub. No.: WO02/070981

PCT Pub. Date: Sep. 12, 2002

(65) Prior Publication Data

US 2004/0069896 A1    Apr. 15, 2004

(30) Foreign Application Priority Data

Jun. 3, 2001    (FR) .................................. 01 03016

(51) Int. Cl.
*G01P 3/36*    (2006.01)
*F42B 15/01*    (2006.01)
(52) U.S. Cl. ..................... 356/29; 356/141.1; 244/3.16
(58) Field of Classification Search ................. 356/29, 356/141.1; 244/3.11, 3.13, 3.16
See application file for complete search history.

(56) References Cited

U.S. PATENT DOCUMENTS 3,723,005 A * 3/1973 Smith et al. ................... 356/29
4,040,744 A * 8/1977 Schertz et al. ........... 356/141.1
4,143,835 A * 3/1979 Jennings et al. ........... 244/3.11

FOREIGN PATENT DOCUMENTS

| DE | 3238896 | 6/1988 |
|----|---------|--------|
| EP | 0770884 | 5/1997 |
| FR | 2367291 | 5/1978 |

* cited by examiner

*Primary Examiner*—Thomas H. Tarcza
*Assistant Examiner*—Isam Alsomiri
(74) *Attorney, Agent, or Firm*—Blakely Sokoloff Taylor & Zafman

(57) ABSTRACT

The invention concerns a laser pointing sighting system comprising a designator range finder (19) including means (E) for emitting a designating laser beam and reception means (R) for detecting and processing the reflection of a hot spot formed by said beam on a target, said reception means (R) are capable in the absence of designating beam emission by the range finder, of detecting the reflection of a hot spot formed on a target by a third designating device, the system comprising means capable, when the reception means detect such a hot spot, of being automatically oriented relative to the direction defined by said spot.

11 Claims, 2 Drawing Sheets

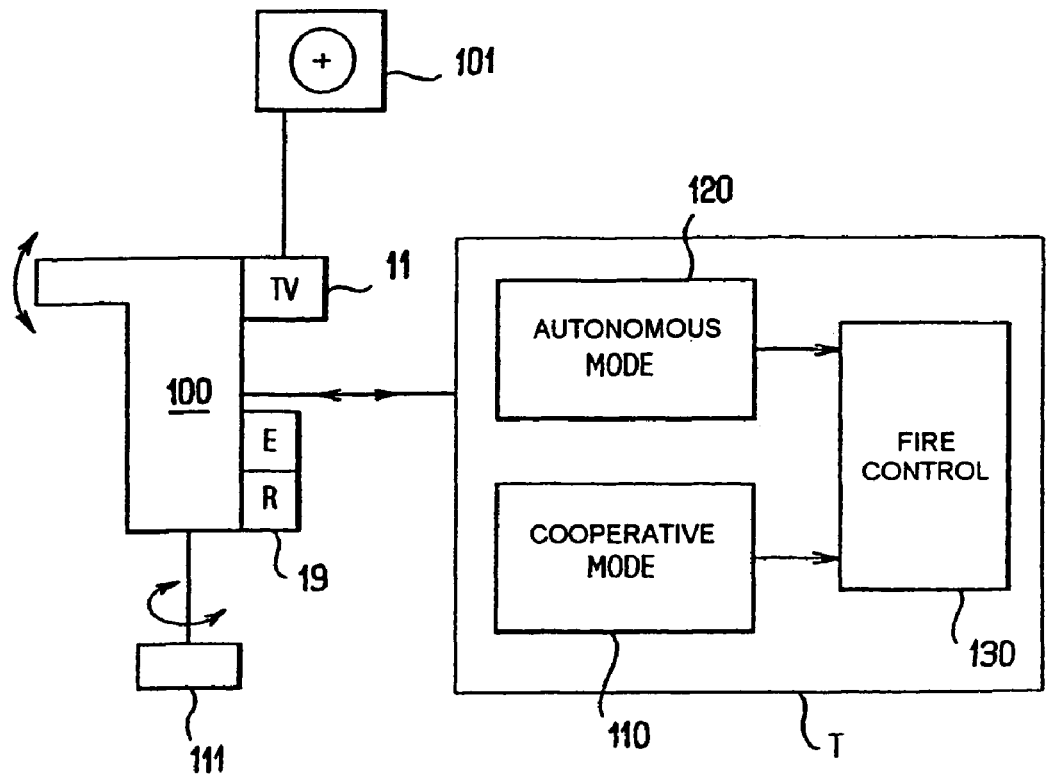
FIG_2
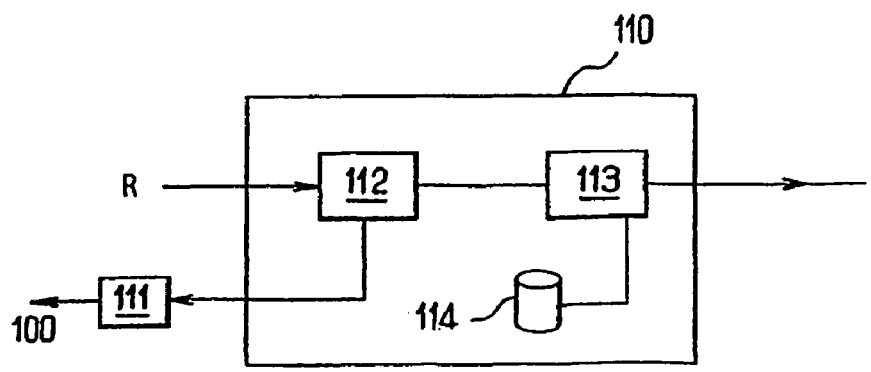
FIG_3

LASER POINTING SIGHTING SYSTEM WITH DESIGNATOR RANGE FINDER

GENERAL FIELD AND PRIOR ART

The invention relates to laser designator/rangefinder sighting systems.

Conventionally, sighting systems of the designator/viewfinder type are known, these comprising, in addition to a purely optical viewing and sighting channel, one or more TV or IR camera display channels, together with a laser emission/receive channel that is used both for the rangefinding function and for the designating function.

In general, these sighting systems operate in "autonomous" mode: the laser channel of the rangefinder is used to illuminate a target that it is desired to designate with a laser-guided weapon that is fired by the vehicle equipped with the sighting system and that is guided onto the laser spot formed on the target.

Also known are sighting systems in which the target is designated in "cooperative" mode: the target is then illuminated by means different from those of the vehicle that carries and fires the guided weapon. For this mode of operation, it is then necessary for the sighting system of this vehicle to have means allowing it to detect the illumination spot on the target and to slave its line of sight to this spot so that the guided weapon is fired in the direction of the designated target and only when the latter is effectively illuminated.

At the present time, sighting systems that allow operation in cooperative mode are relatively complex. They incorporate means for measuring differences with respect to the laser spot, which means are specifically dedicated to this function and are juxtaposed on the various other channels of the sighting system, being very specifically twinned with said other channels, thereby complicating the design of the systems and increasing the volume, weight and cost thereof.

PRESENTATION OF THE INVENTION

The invention proposes a sighting system that is capable of operating in autonomous mode and in cooperative mode and that does not have the drawbacks of the sighting systems that are known at the present time as allowing operation in cooperative mode.

The proposed sighting system is a laser sighting system, of the type comprising a designator/rangefinder comprising means for emitting a designating beam and receive means for detecting and processing the reflection of a light spot formed by said beam on a target, characterized in that said receive means are capable, in the absence of a designating beam being emitted by the rangefinder, of detecting the reflection of a light spot formed on a target by a third-party designating device, the system including means capable, when the receive means of the rangefinder detect such a light spot, of being automatically oriented in relation to the direction defined by said spot.

It will be noted that such a system has the advantage of allowing operation in cooperative mode without requiring optical channels and detectors other than those generally present in sighting systems.

Such a system is also advantageously supplemented by the following various features taken individually or in their technically possible combinations:

it includes means capable of slaving the line of sight to the light spot detected by the receive means of the rangefinder;

the slaving means include means capable of introducing perturbations in the viewing direction of the rangefinder and of slaving this direction to the maximum detection flux received by the receive means of the rangefinder;

it includes a camera display channel, the viewing direction of which is aligned with the viewing direction of the rangefinder, the rangefinder channel and the display channel being partly common;

the field of view of the rangefinder channel is of the order of 1 mrad;

the perturbations in the line of sight correspond to perturbations of the order of 1 to 10 pixels on the image recorded by the camera;

it includes means for slaving the line of sight by automatic tracking prior to a light spot being detected by the rangefinder;

it includes means capable of verifying a wavelength and/or a code on the light spot detected.

The invention also proposes a method of designating a target, characterized in that it involves:

positioning of the target in the field of view of a system of the aforementioned type;

emission of a laser beam by a third-party designator onto the target;

detection of the spot formed on the target by said beam; and locking of the target designated by the sighting system.

Especially advantageously, the target is positioned in the field of view by automatic tracking.

The invention also proposes a fire control system, characterized in that it includes a sighting system of the aforementioned type and in that the system includes means capable of authorizing the firing of the weapon when the receive means of the rangefinder detect such a light spot.

PRESENTATION OF THE FIGURES

Other features and advantages of the invention will become apparent during the description below of a preferred embodiment. In the appended drawings:

FIG. 2 is a diagram showing the principle of the preferred embodiment of the invention; and FIG. 3 is a diagram showing the principle of the operation of the cooperative mode of the preferred embodiment of the invention.

DESCRIPTION OF ONE OR MORE POSSIBLE EMBODIMENTS

Optical Structure

Figure 1:
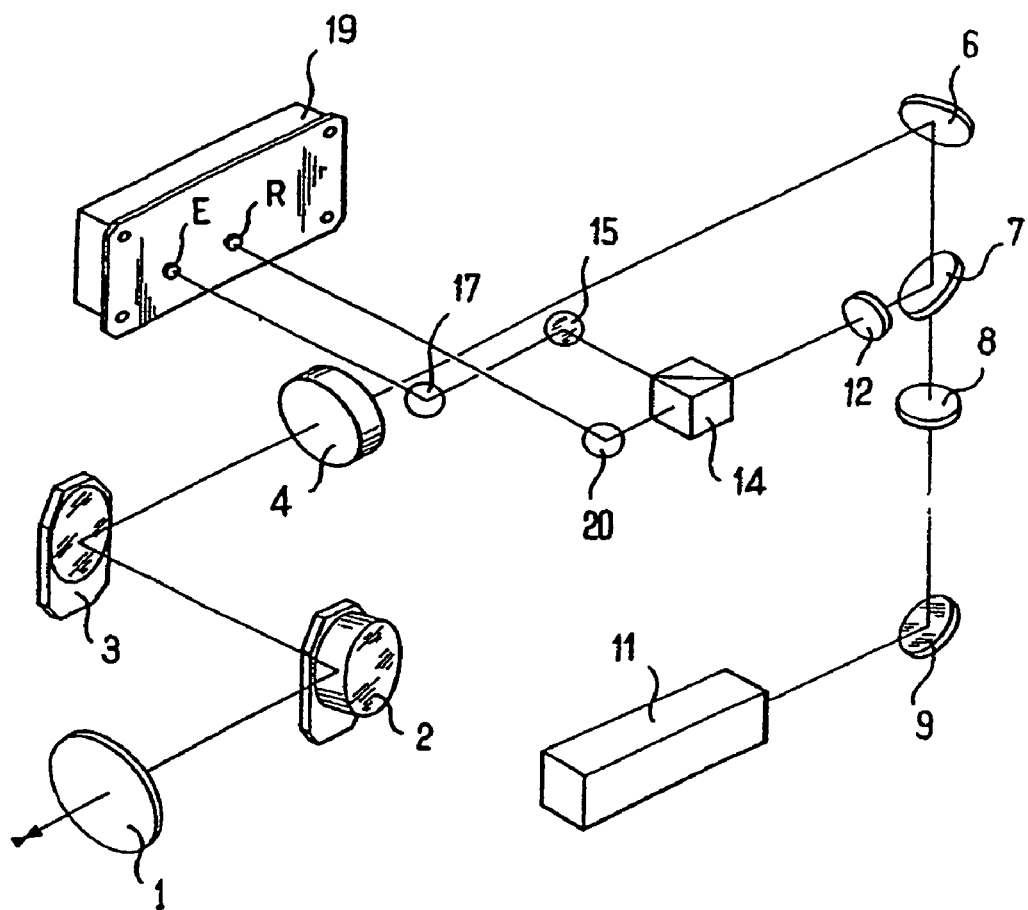
FIG. 1 is a schematic representation of an optical structure of a sighting/fire control system according to one possible embodiment of the invention.

FIG. 1 shows the optical arrangement of the rangefinder and TV channels of a sighting/fire control system with the general reference 100.

This arrangement includes an optical head that is common to the TV and rangefinder channels and that comprises an entry window 1, fine stabilization means 2, a front lens 4 and deflection mirrors (front mirror 3 and mirror 6).

It also includes a dichroic mirror 7 that delivers the light beams received by the optical head, on the one hand, to optical means specific to the TV channel and, on the other hand, to optical means specific to the rangefinder channel.

In the example illustrated in FIG. 1, the means specific to the TV channel include a lens 8 and a deflection mirror 9 that send the image received by the plate 7 as input for a camera 11, which is for example a camera 11 which is for example a TV camera, but which may also be an IR camera.

The means specific to the rangefinder channel include a splitter cube 14 that sends, via a convergent lens 12, the light beams received from the dichroic plate 7 onto receive means R of a rangefinder 19 and that receives, from emission means E of this rangefinder, the laser-type beam emitted by the latter, the beam emitted by the rangefinder passing through said dichroic cube 14 in order to be sent via the mirror 7 onto the optical head of the sighting/fire control system.

In FIG. 1, the references 15, 17 and 20 denote deflection mirrors of the emission and receive channels of the rangefinder.

Of course, many optical configurations other than that shown in FIG. 1 would be conceivable.

In particular, the camera 11 and the rangefinder 19 may have no common channel. However, common-channel architectures are preferred if a laser rangefinder receive field is particularly narrow (typically 1 mrad) compared with the field of a camera (some twenty mrads).

Processing

Apart from an optical structure of the type shown in FIG. 1, a system according to one possible embodiment of the invention includes processing means T that are capable of managing the operation in autonomous mode of the rangefinder 19 (block 120 in FIG. 2) and its operation in cooperative mode (block 110), which means are furthermore capable of managing the slaving of the line of sight and of the firing direction for one and the other of the two operating modes (fire control 130).

In autonomous mode, the direction in which the weapon is aimed is slaved by the fire control to the line of sight, which corresponds to the designating direction of the rangefinder.

In cooperative mode, the rangefinder operates only as receiver and emits no designating beam.

It aims in the viewing direction and line of sight observed by the optical head of the system, if necessary creating small perturbations around this direction.

When the rangefinder 19 detects a laser spot in the direction that it is viewing, the processing means T verify that this laser spot corresponds the wavelength and/or to the code expected for a designating spot.

If this is actually the case, the processing means T slave the line of sight and the firing direction to the direction in which the rangefinder is aimed.

FIG. 3 illustrates schematically means that allow the processing means T to operate in cooperative mode (block 110).

These means comprise means 112 that analyze the light flux received by the detection means R of the rangefinder and operate motor drive means 111 that allow the line of sight to be moved in elevation and in bearing.

These means 112 act in particular on the motor drive means 111 so as to apply small perturbations to the line of sight and to slave the latter to the position corresponding to a maximum detection flux.

The expression "small perturbations" is understood to mean in the present text perturbations that correspond to perturbations of the order of 1 to 10 pixels on the image recorded by the camera 11, making it possible to vary the signal detected so as to be able to be slaved to its maximum without excessively disturbing the image presented.

The processing means also include means 113 that analyze the wavelength and/or the phase, frequency or amplitude modulations that are carried the optical spot detected, in order to verify that this is indeed a designating spot that must allow the firing of the weapon to be authorized.

For this purpose, the means 113 make comparisons between the codes determined by synchronous demodulation of the optical spot detected and designation codes, that are for example stored in storage means 114 provided for this purpose.

These designating codes may, for example, be NATO (STANAG 3733) codes or any other designation code used for illuminating targets.

EXAMPLE OF USE

A system of the type described above is, for example, used in the following manner.

Firstly, a target to be designated is indicated to the sighting system by conventional means, such as GPS coordinates or else navigation coordinates or else a visual descriptor.

The sighting system is then slaved by automatic tracking to the target thus designated.

For example, if the target is designated by a visual descriptor, the automatic tracking may be carried out by conventional difference measurement or image processing means in the TV or IR channel that corresponds to the camera 11, the image recorded by said camera being displayed on a screen (screen 101 in FIG. 2) on which a sighting graticule also appears.

When the sighting system is slaved to the area that has been indicated thereto, a third-party designator (a soldier near the target, for example) illuminates the target using a laser-type designating beam which is, for example, pulsed according to a defined designation code.

The spot formed on this target by the designating beam can then be detected by the rangefinder 19.

It will be noted that such detection does not require within the rangefinder 19 optical means or amplification means other than those used for the autonomous mode: detection, in cooperative mode, of the optical spot formed by the third-party designator takes place under conditions equivalent to the case of designation in autonomous mode.

Since the designation code used to illuminate the target (NATO, STANAG 3733 or any other code) is known by the rangefinder, the processing means T carry out synchronous detection in order to detect the desired illumination.

The narrowness of the laser receive field (typically 1 mrad) makes it possible to keep the line of sight of the designator/sight in the direction of the designated target with precision sufficient for the engagement and the firing having to reach this target.

To supplement the positional locking that it is thus possible to achieve, the system may also control the motor drive means 111 in order to introduce slight perturbations in the line of sight and to slave the latter to the maximum flux in synchronous detection mode.

Once the sighting/fire control system is locked onto the designating spot, the operator may then engage and fire the weapon that must be guided onto this spot.

The invention claimed is:

1. A laser sighting system, of the type comprising a designator/rangefinder (19) comprising means (E) for emitting a designating beam and receive means (R) for detecting and processing the reflection of a light spot formed by said beam on a target, characterized in that said receive means (R) are capable, in the absence of a designating beam being emitted by the rangefinder, of detecting the reflection of a light spot formed on a target by a third-party designating device, the system including means capable, when the receive means of the rangefinder detect such a light spot, of being automatically oriented in relation to the direction defined by said spot.

2. The system as claimed in claim 1, characterized in that it includes means (112) capable of slaving the line of sight to the light spot detected by the receive means of the rangefinder.

3. The system as claimed in claim 2, characterized in that the slaving means (112) include means capable of introducing perturbations in the viewing direction of the rangefinder and of slaving this direction to the maximum detection flux received by the receive means of the rangefinder (19).

4. The system as claimed in claims 3, characterized in that the perturbations in the line of sight correspond to perturbations of the order of 1 to 10 pixels on the image recorded by the camera (11).

5. The system as claimed in claim 1, characterized in that it includes a camera display channel (11), the viewing direction of which is aligned with the viewing direction of the rangefinder, the rangefinder channel and the display channel being partly common.

6. The system as claimed in claim 1, characterized in that the field of view of the rangefinder channel is of the order of 1 mrad.

7. The system as claimed in claim 1, characterized in that it includes means for slaving the line of sight by automatic tracking prior to a light spot being detected by the rangefinder.

8. The system as claimed in claim 1, characterized in that it includes means capable of verifying a wavelength and/or a code on the light spot detected.

9. A method of designating a target, characterized in that it involves: positioning of the target in the field of view of a system including a designator/rangefinder (19) means (E) for emitting a designating beam and receive means (R) for detecting and processing the reflection of a light spot formed by said beam on a target, characterized in that said receive means (R) are capable, in the absence of a designating beam being emitted by the rangefinder, of detecting the reflection of a light spot formed on a target by a third-party designating device, the system including means capable, when the receive means of the rangefinder detect such a light spot, of being automatically oriented in relation to the direction defined by said spot, said method comprising the steps of:

emission of a designating beam by a third-party designator onto the target;

detection of the spot formed on the target by said beam; and locking of the target designated by the sighting system.

10. The method as claimed in claim 9, characterized in that the target is positioned in the field of view by automatic tracking.

11. A fire control system, characterized in that it includes a sighting system comprising a designator/rangefinder (19 means (E) for emitting a designating beam and receive means (R) for detecting and processing the reflection of a light spot formed by said beam on a target, characterized in that said receive means (R) are capable, in the absence of a designating beam being emitted by the rangefinder, of detecting the reflection of a light spot formed on a target by a third-party designating device, the system including means capable, when the receive means of the rangefinder detect such a light spot, of being automatically oriented in relation to the direction defined by said spot, and in that the system includes means capable of authorizing the firing of the weapon when the receive means of the rangefinder detect such a light spot.

* * * * *